Patented July 7, 1925.

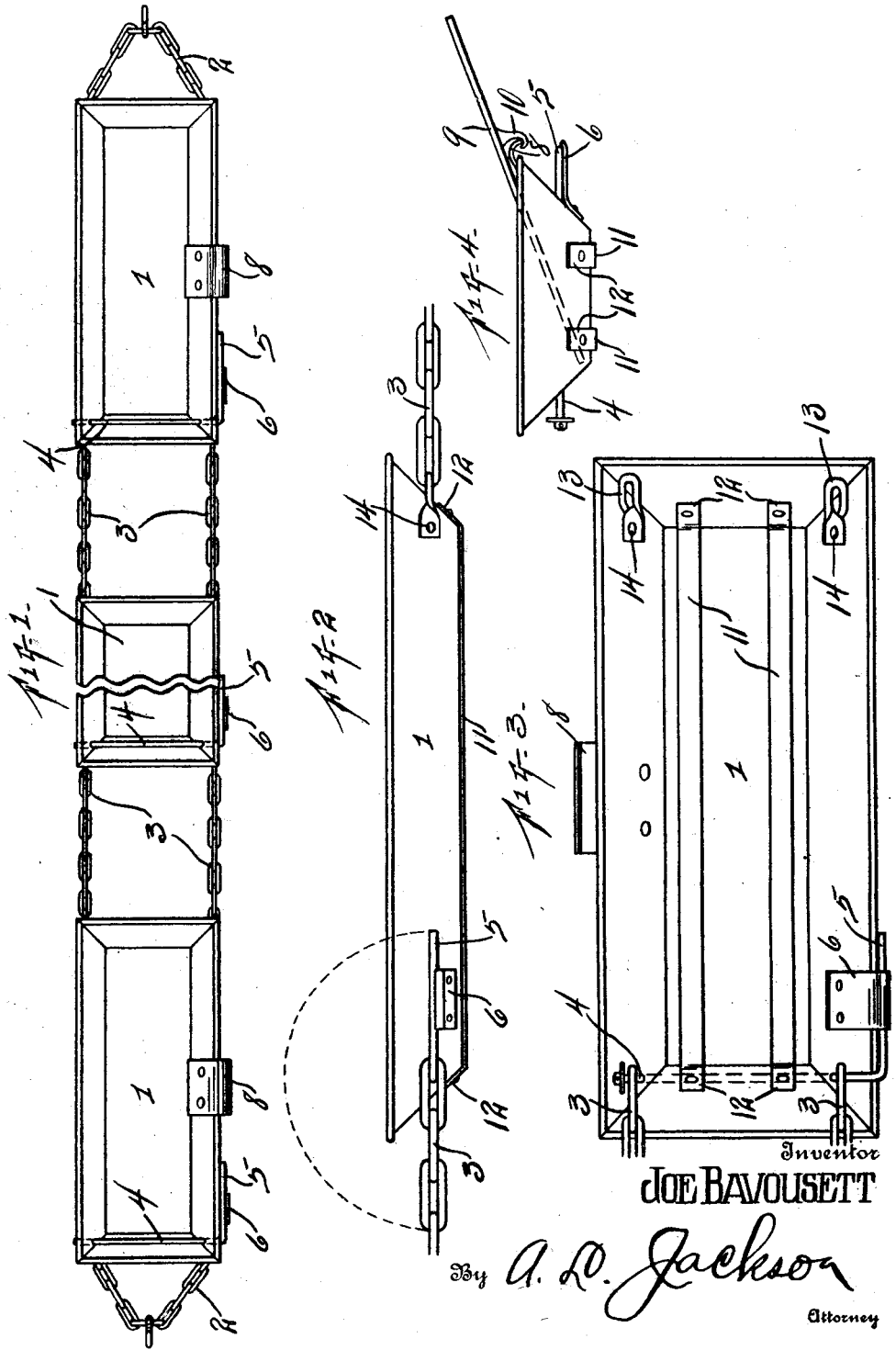

1,544,965

UNITED STATES PATENT OFFICE.

JOE BAVOUSETT, OF FORT WORTH, TEXAS.

DRAG-PAN CONVEYER.

Application filed October 6, 1923. Serial No. 666,935.

*To all whom it may concern:*

Be it known that I, JOE BAVOUSETT, a citizen of the United States, residing at Fort Worth, in the county of Tarrant and State of Texas, have invented certain new and useful Improvements in Drag-Pan Conveyers, of which the following is a specification.

My invention relates to drag pan conveyers; and more particularly to means for conveying dirt and other matter in grading and excavating the earth for various purposes, such as road building and the leveling of ground and the like and which will effect a great saving of labor and will avoid much expense of purchasing costly machinery. One of the advantages of this invention is that the device is simple in construction and can be manufactured at small cost and will take the place of many wheeled conveyers and the device can be drawn by a tractor of the caterpillar type and one tractor can draw a drag pan conveyer of many units. Another advantage is in the loading of the pans. Dirt may be thrown by plows or scrapers directly into the pans and any pan may be inverted to dump the load independently of all other pans. Other objects and advantages will be fully explained in the following description and the invention will be more particularly pointed out in the claims.

Reference is had to the accompanying drawings which form a part of this application.

Fig. 1 is a plan view of three pans connected in series. Fig. 2 is an enlarged side elevation of one pan. Fig. 3 is a bottom plan view of the same. Fig. 4 is an end view of a pan, showing a dumping device applied thereto.

Similar characters of reference are used to indicate the same parts throughout the several views.

A number of pans 1 of rectangular construction provided with outwardly inclined side and end walls are operatively connected together. At each end of the series, the end pans may be provided with chains 2 for connecting to a tractor. The pans are connected in series by chains 3. For making each pan capable of being turned over independently of the adjacent pans, one of the chains 3 is detachable in each pan. At one end, each pan is provided with a pivot rod 4 to which are connected the chains 3. Each rod 4 is bent to form a locking detent 5. The rod 4 is journaled in the pan and the detent 5 is swung forward and supported in a bracket 6 when the pan is in use. When the pan is to be turned over for dumping its load, the detent 5 is swung backwardly as shown by dotted outline in Fig. 2. The chain 3 will then fall off. It will be understood that the detent of the adjacent pan must also be released before the pan can be turned.

Each pan may be provided with a hook 8 for convenience in turning the pan upside down for dumping its load. A bar 9 provided with a hook 10 may be used for turning the pans over. Each pan may be provided with cleats 11 on the bottoms and the ends of the cleats are bent upwardly at 12 to be attached to the inclined end walls of the pan. The cleats 11 tend to prevent wear of the bottoms of the pans. The chains 3 may be attached to the pans by loops 13 with rivets 14. It is apparent that there may be more of the detents 5 if necessary in operating the device. Other changes may be made without departing from my invention.

This invention is particularly useful in drift work, such as leveling hills by moving the earth to the valleys. The cleats 11 constitute runners for the pans and prevent wear of the pans to some extent.

What I claim, is,—

1. A drag pan conveyer comprising a series of pans and flexible connections for connecting the forward and rear corners of a pan to the corners of adjacent pans, the connections at one end of a pan including a pivot rod provided with a detachable detent.

2. A drag pan conveyer comprising a plurality of pans, chains for connecting the adjacent corners of the pans to form a series of pans in alignment with each other, and a pivot rod in one end of each pan for engaging said chains and provided with a locking detent for holding one of the chains locked and for releasing the chain when a pan is to be turned over for dumping its load.

3. A drag pan conveyer comprising a plurality of relatively low pans, flexible connections for connecting the corners of adjacent pans to form a series of pans in alignment with each other, the connections at one end including a pivot rod provided with a locking detent for making a detachable connection for one corner of the pan, and means for turning a pan over after one corner is detached.

In testimony whereof, I set my hand, this 2nd day of October, 1923.

JOE BAVOUSETT.